(12) United States Patent
Kesterson et al.

(10) Patent No.: US 8,564,270 B2
(45) Date of Patent: Oct. 22, 2013

(54) ON-TIME COMPENSATION FOR SWITCHING POWER CONVERTERS

(71) Applicant: iWatt Inc., Campbell, CA (US)

(72) Inventors: John William Kesterson, Seaside, CA (US); Liang Yan, Milpitas, CA (US)

(73) Assignee: iWatt Inc., Campbell, CA (US)

( * ) Notice: Subject to any disclaimer, the term of this patent is extended or adjusted under 35 U.S.C. 154(b) by 0 days.

(21) Appl. No.: 13/759,639

(22) Filed: Feb. 5, 2013

(65) Prior Publication Data

US 2013/0242629 A1 Sep. 19, 2013

Related U.S. Application Data

(60) Provisional application No. 61/611,473, filed on Mar. 15, 2012.

(51) Int. Cl.
*G05F 1/40* (2006.01)
*H02M 3/156* (2006.01)

(52) U.S. Cl.
USPC ............ 323/284; 323/271; 323/285; 323/222

(58) Field of Classification Search
USPC .......................... 323/222, 282–285, 290, 351
See application file for complete search history.

(56) References Cited

U.S. PATENT DOCUMENTS

| | | | |
|---|---|---|---|
| 4,686,615 A * | 8/1987 | Ferguson | 363/17 |
| 5,517,399 A * | 5/1996 | Yamauchi et al. | 363/89 |
| 7,116,090 B1 | 10/2006 | Yang et al. | |
| 7,148,664 B2 * | 12/2006 | Takahashi et al. | 323/222 |
| 7,643,322 B1 * | 1/2010 | Varga et al. | 363/97 |
| 2010/0165672 A1 | 7/2010 | Li et al. | |
| 2012/0026765 A1 * | 2/2012 | Adragna | 363/78 |
| 2013/0169172 A1 | 7/2013 | Kesterson et al. | |

* cited by examiner

*Primary Examiner* — Jessica Han
(74) *Attorney, Agent, or Firm* — Fenwick & West LLP (57) ABSTRACT

An improved discontinuous current mode (DCM) switching power converter that compensates for the effect of dead time. The dead time of the switching power converter is measured during a switching cycle and a baseline on-time for a switch of the switching power converter is determined. The dead time and baseline on-time are used in calculating the desired on-time of the switch during a subsequent switching cycle of the power converter. The desired switch on-time regulates the output voltage to a desired voltage level. The desired switch on-time also maintains the average input current to the power converter in proportion to the input voltage, thereby improving the power factor of the switching power.

23 Claims, 8 Drawing Sheets

ON-TIME COMPENSATION FOR SWITCHING POWER CONVERTERS

CROSS REFERENCE TO RELATED APPLICATION

This application claims priority from U.S. Provisional Patent Application No. 61/611,473, filed on Mar. 15, 2012, the contents of which are incorporated by reference herein in their entirety.

BACKGROUND

1. Field of the Disclosure

The present disclosure relates to switching power converters, and more specifically to improved on-time compensation for switching power converters.

2. Description of the Related Art

Switching power converters are used in many different electronic devices to generate a regulated output voltage from an input voltage by cyclically turning a switch on and off to adjust a level of the regulated output voltage. Some power converters operate in discontinuous current mode (DCM). In DCM, the switch is turned on to allow current to flow into an inductor of the switching power converter. The switch is then turned off to allow current to flow out of the inductor and out towards the load, thereby resetting the inductor. A dead time is inserted after the reset time that limits the switching frequency of the switch. If there is voltage ringing at the top side of the switch, the length of the dead time can be modified to allow the switching to occur at the valley of the ringing.

Inserting the dead time is useful for reducing an amount of power lost in the switch itself, but has the negative side effect of reducing the power factor of the switching power converter. The power factor of a power converter impacts the power delivery system, such as the utility transmission lines that supply AC power to the power converter. If the power factor of a converter is low, the utility company must waste more power to deliver the required power to a load. To maximize the power factor, the average input current to the switching power converter should be proportional to the input voltage. In power converters that have a fixed on-time and no dead time, the average input current is naturally proportional to the input voltage and good power factor can be achieved. However, in power converters that have a dead time, the length of the dead time affects the level of the average input current and causes the average input current to deviate from being proportional to the input voltage. As a result, the power factor of the power converter is reduced by the dead time.

SUMMARY

Embodiments of an improved DCM switching power converter that compensates for the effect of dead time duration when computing on-time duration. The dead time duration of the switching power converter is measured during a switching cycle and a baseline on-time duration for a switch of the switching power converter is determined. The dead time duration and baseline on-time duration are used in calculating the desired on-time duration of the switch for a subsequent switching cycle. The desired switch on-time duration regulates the output voltage to a desired voltage level. The desired switch on-time duration also maintains the average input current to the power converter substantially in proportion to the input voltage, thereby making the power converter appear as a resistive load and improving the power factor of the switching power.

In one embodiment, a switching power converter comprises a magnetic component coupled between an input voltage and an output voltage of the switching power converter. A switch is coupled to the magnetic component to control current through the magnetic component. Current flowing into the magnetic component increases when the switch is turned on and decreases to a constant current level when the switch is turned off. A controller is configured to generate a control signal to turn on or turn off the switch, and the switch is turned on responsive to the control signal being in a first state and the switch is turned off responsive to the control signal being in a second state. The controller is further configured to determine a dead time duration of a first switching cycle of the power converter, the dead time duration being a duration of time during which the current flowing into the magnetic component is at the constant current level. The controller is further configured to determine a desired on-time duration of the switch for a second switching cycle of the power converter based on the dead time duration in the first switching cycle, the second switching cycle being subsequent to the first switching cycle. The controller is additionally configured to generate, for the second switching cycle, the control signal in the first state for a duration of time that turns on the switch according to the desired on-time duration.

In one embodiment, the controller is further configured to determine a baseline on-time duration of the switch. The baseline on-time duration may represent an on-time duration of the switch that regulates the output voltage to a desired voltage level if the dead time is zero. The controller then determines the desired on-time duration based on the baseline on-time duration and the dead time duration in the first switching cycle. The desired on-time duration may be computed with a mathematical function that has a square root calculation involving the baseline on-time duration or a simplified function that does not have the square root calculation. The desired turn on time may also be computed with a linear piecewise approximation of the square root calculation to reduce the circuitry needed to compute the desired turn on time.

In one embodiment, a method of operation in the switching power converter comprises determining a dead time duration of a first switching cycle of the switch, the dead time being a duration of time during which the current flowing into the magnetic component is at the constant current level. The method also comprises determining a desired on-time duration of the switch for a second switching cycle based on the dead time duration in the first switching cycle, the second switching cycle being subsequent to the first switching cycle. The method further comprises generating, for the second switching cycle, the control signal in the first state for a duration of time that turns on the switch according to the desired on-time duration.

In one embodiment, a controller for the switching power converter comprises a switch control circuit configured to generate a control signal to turn on or turn off the switch, the switch turned on responsive to the control signal being in a first state and the switch turned off responsive to the control signal being in a second state. The controller is configured to determine a dead time duration of a first switching cycle of the switch, the dead time being a duration of time during which the current flowing into the magnetic component is at the substantially constant current level. The controller is configured to determine a desired on-time duration of the switch for a second switching cycle based on the dead time duration in the first switching cycle, the second switching cycle being subsequent to the first switching cycle. The switch control circuit is also configured to generate, for the second switching cycle, the control signal in the first state for a duration of time that turns on the switch according to the desired on-time duration.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF DRAWINGS

The teachings of the embodiments of the present disclosure can be readily understood by considering the following detailed description in conjunction with the accompanying drawings.

DETAILED DESCRIPTION OF EMBODIMENTS

The Figures and the following description relate to preferred embodiments of the present disclosure by way of illustration only. It should be noted that from the following discussion, alternative embodiments of the structures and methods disclosed herein will be readily recognized as viable alternatives that may be employed without departing from the principles of the present disclosure.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present disclosure for purposes of illustration only. One skilled in the art will readily recognize from the following description that alternative embodiments of the structures and methods illustrated herein may be employed without departing from the principles of the disclosure described herein.

Embodiments disclosed herein relate to an improved DCM switching power converter that compensates for the effect of dead time. The dead time duration of the switching power converter is measured during a switching cycle and a baseline on-time duration for a switch of the switching power converter is determined. The dead time and baseline on-time duration are used in calculating the desired on-time duration of the switch for a subsequent switching cycle. The desired switch on-time duration regulates the output voltage to a desired voltage level. The desired switch on-time duration also maintains the average input current to the power converter substantially in proportion to the input voltage, thereby improving the power factor of the switching power.

Figure 1:
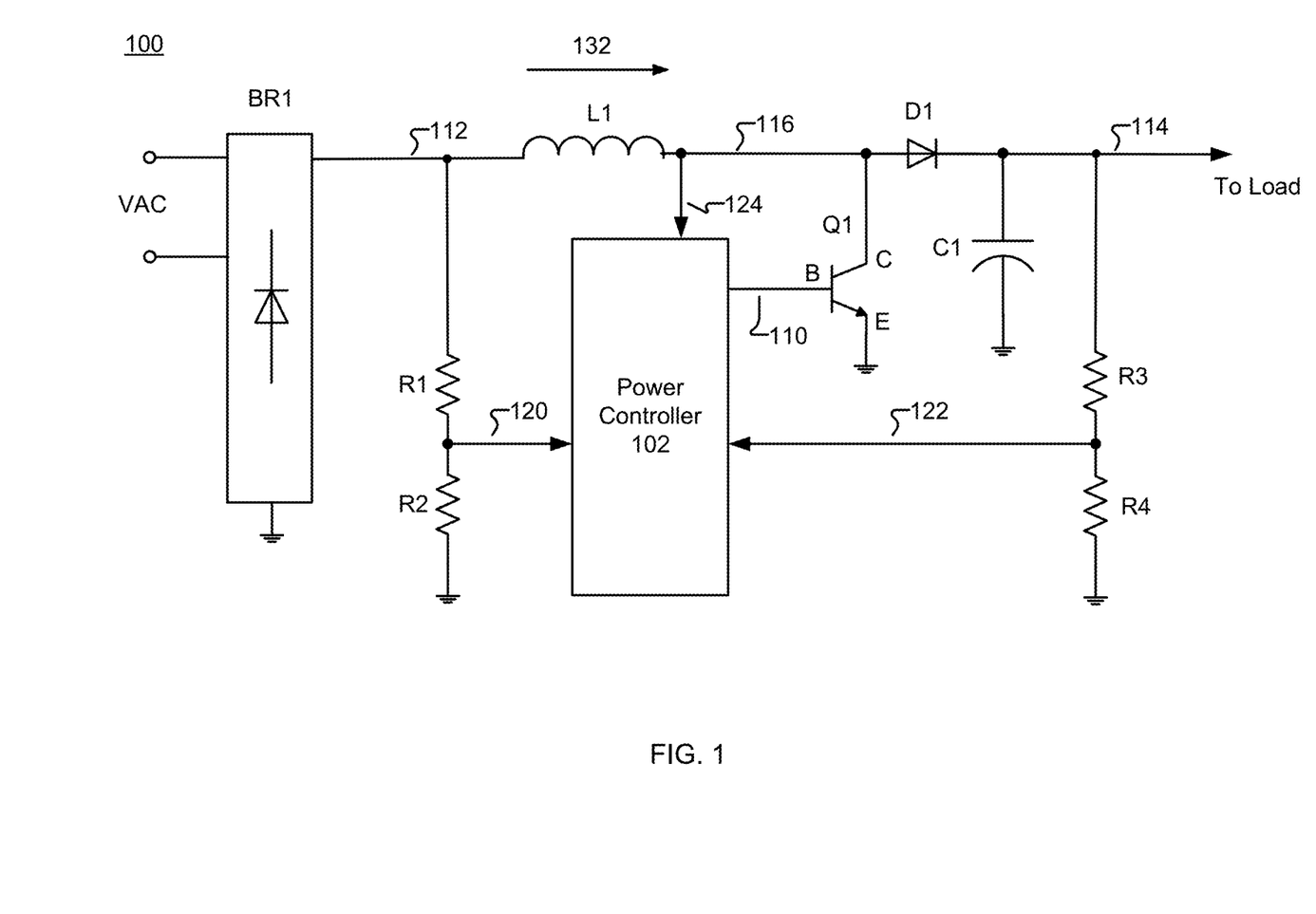
FIG. 1 illustrates a switching power converter, according to one embodiment.

FIG. 1 illustrates an exemplary switching power converter 100 in accordance with one embodiment. As illustrated, the power converter 100 is an AC to DC boost converter, but other topologies of switch-mode power converters with on-time compensation can be designed in accordance with the teachings described herein. For example, in one embodiment the switch-mode power converter 100 may be a flyback converter instead of a boost converter.

At the front end, the switching power converter 100 includes a bridge rectifier BR1 that receives an alternating current (AC) input voltage VAC. The bridge rectifier BR1 rectifies the AC input voltage VAC and generates a rectified but unregulated input voltage 112. The rectified input voltage 112 is applied to the input side of inductor L1. In other embodiments, inductor L1 may be another type of magnetic energy storage component, such as a transformer.

Controller 102 maintains output regulation via control of the ON and OFF states of switch Q1 via a control signal 110 output from the controller 102. In one embodiment, controller 102 is an application-specific integrated circuit (ASIC) and generates the control signal 110 in accordance with the on-time compensation techniques described herein.

Control signal 110 drives the control terminal of switch Q1. In the embodiment illustrated by FIG. 1, switch Q1 is a bipolar junction transistor (BJT), so the control terminal is the base (B) terminal of switch Q1. The collector (C) of switch Q1 is connected in series with the inductor L1. The emitter (E) of switch Q1 is connected to ground. In other embodiments, switch Q1 can be another type of transistor such as a MOSFET or any other device capable of opening or closing a circuit in a controlled manner. In one embodiment, controller 102 can employ pulse-width-modulation (PWM) to control the ON and OFF states and duty cycles of BJT power switch Q1, as well as the amplitude of the base current of BJT switch Q1.

As the switch Q1 is turned ON and OFF, it generates a regulated output voltage 114 that provides power to the load (not shown). Specifically, when switch Q1 is turned ON, a current path is created through the transistor Q1 that causes the current 132 in inductor L1 to increase, thereby storing energy in the inductor L1. When the switch Q1 is turned OFF, energy in the inductor L1 decreases as current 132 flows from the inductor L1 through the diode D1 to charge the capacitor C1. The switching action of the switch Q1 thus controls current 132 through the inductor L1 and generates a regulated output voltage 114. Because the power converter 100 is a boost converter, the regulated output voltage 114 has a higher voltage level than the rectified input voltage 112.

Resistors R1 and R2 divide down the rectified input voltage 112 to generate a voltage input sensing signal 120 that tracks the rectified input voltage 112. Resistors R3 and R4 divide down the regulated output voltage 114 to generate an output voltage sensing signal 122 that tracks the regulated output voltage 114. The voltage at the collector of switch Q1 is referred to herein as a collector voltage 116. The collector voltage 116 is provided to the power controller 102 via the collector voltage sensing signal 124 that tracks the collector voltage 116 level. In some embodiments, instead of being connected to the output of the inductor L1, the collector voltage sensing signal 124 may be connected to a secondary winding of the inductor L1 to sense a differential voltage across the inductor L1. The input voltage sensing signal 120, output voltage sensing signal 122, and collector voltage sensing signal 124 are used by the power controller 102 to control the on-time of the transistor Q1, as will be described in greater detail.

Figure 2A:
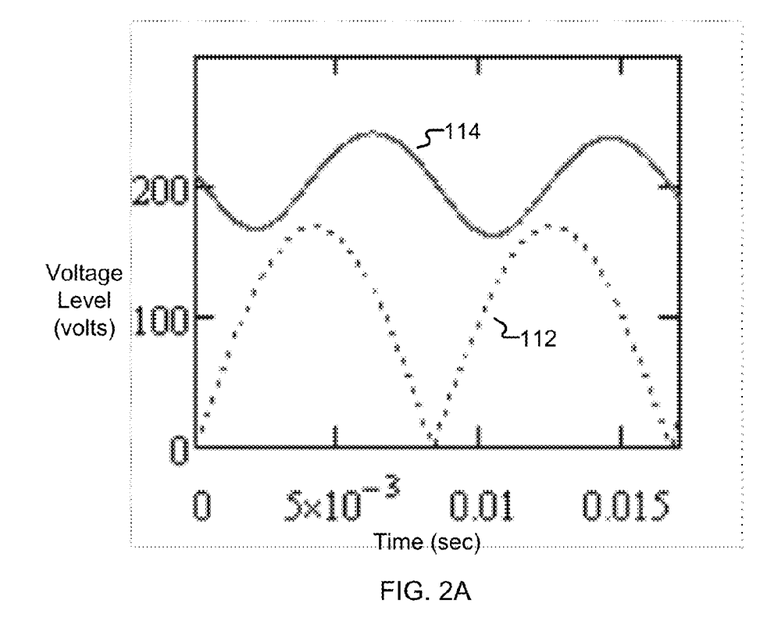
FIG. 2A illustrates waveforms for the input voltage and output voltage of the switching power converter, according to one embodiment.

FIG. 2A illustrates waveforms for the input voltage 112 and output voltage 114 of the switching power converter 100, according to one embodiment. The horizontal axis represents time and the vertical axis represents voltage level. As shown, the regulated input voltage 112 is a periodic signal. The regulated input voltage 112 operates at double the frequency of the AC input voltage VAC, for example, at a frequency of between 100-120 Hz such that each cycle of the input voltage 112 is approximately 8-10 ms long. The average voltage level of the regulated input voltage 112 is lower than the average voltage level of the regulated output voltage 114. For example, the average level of the regulated output voltage 114 can be 30 volts above the peak of the input voltage 112.

Figure 2B:
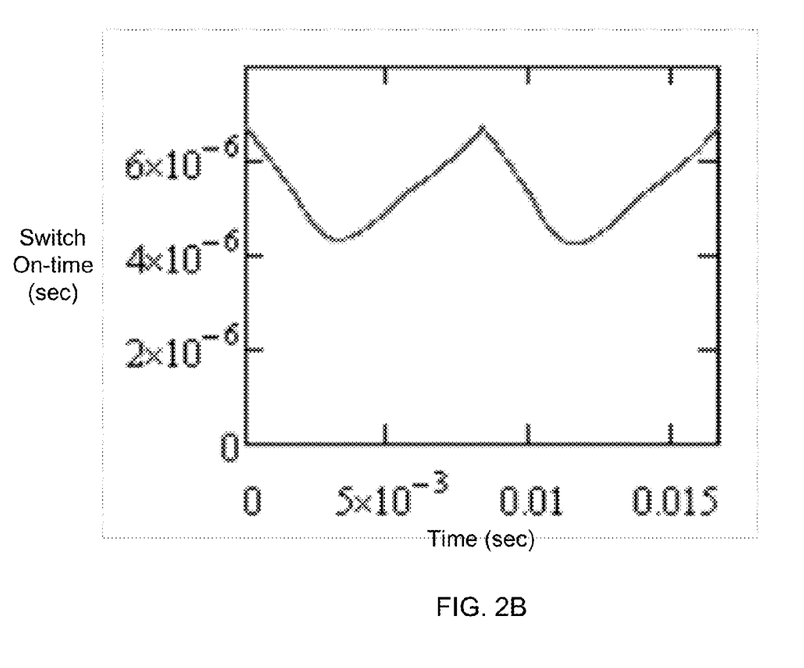
FIG. 2B illustrates the on-time of the switch Q1 of the power converter over time, according to one embodiment.

FIG. 2B illustrates the on-time duration of the switch Q1 of the power converter 100 over time, according to one embodiment. The horizontal axis represents time and the vertical axis represents the on-time duration of the switch Q1 (i.e., the duration of time during which the switch Q1 is on). The on-time duration of the switch Q1 increases and decreases over time in order to maintain regulation of the output voltage 114 while also increasing the power factor of the power converter 100. In one embodiment, the power controller 102 sets the on-time duration of the switch Q1 based on factors such as the level of the input voltage 112, the level of the output voltage 114, a baseline on-time duration of the switch Q1, and a dead time duration of the power converter 100.

Figure 2C:
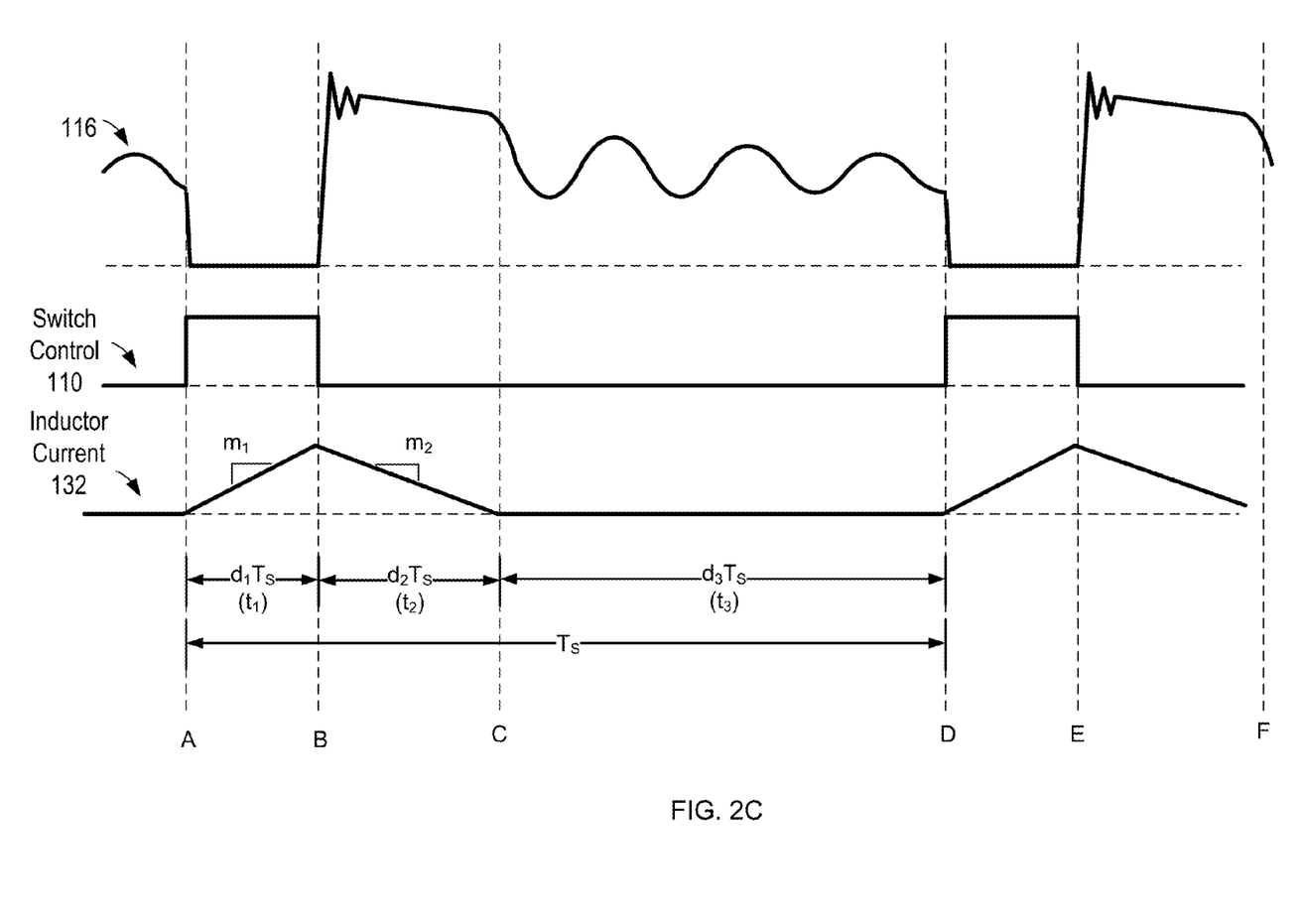
FIG. 2C illustrates operational waveforms for the switching power converter, according to one embodiment.

Referring to FIG. 2C, illustrated are operational waveforms for the switching power converter 100, according to one embodiment. The collector voltage 116 is shown at the top of the figure, the switch control signal 110 for the switch Q1 is shown in the middle of the figure, and the current 132 flowing into the inductor L1 from the bridge rectifier BR1 is shown at the bottom of the figure.

The duration of time extending from time A to time D represents one switching cycle of the power converter 100. The duration of time extending from time D past time F represents another switching cycle. The total length of time from time A to time F shown in FIG. 2C represents only a fraction of the time shown in FIG. 2A. For example, the x axis in FIG. 2A and FIG. 2B represents a total of 16 ms of time, while FIG. 2C may only show the operation of the power converter 100 over 0.1 ms of time. Thus, there are many switching cycles in each line cycle of the input voltage 114.

At time A, the switch control signal 110 goes HIGH and turns-on the switch Q1. Switch Q1 becomes essentially shorted, and thus the collector voltage 116 is zero volts. Between time A and B, the current 132 flowing into the inductor L1 increases due to the current path through switch Q1.

At time B, the switch control signal 110 goes LOW and turns-off the switch Q. The energy in inductor L1 bleeds away through diode D1 and the current 132 flowing into the inductor L1 starts decreasing until it reaches a constant zero current level at time C. When the current 132 flowing into the inductor reaches a zero current level, the inductor is considered to be "reset" because it has lost most of its energy. The period between time B and time C is thus referred to as the "inductor reset period." During the inductor reset period, the collector voltage 116 has a voltage level that can be higher than that of the rectified input voltage 112.

At time C, diode D1 stops conducting and no longer draws current 132 from the inductor L1. The current 132 in the inductor L1 is essentially zero and constant between times C and D as no current path exists for current 132 to flow into or out of the inductor L1. The period of time between C and D is referred to herein as a "dead time" because of the lack of current 132 flowing into the inductor L1. Additionally, once the diode D1 stops conducting at time C, it causes the inductor L1 to resonate and create a ringing in the collector voltage 116. Due to various damping and loss factors within the power converter 100, the collector voltage 116 is a decaying sinusoidal signal between time C and time D.

At time D, the switch Q1 is turned on again to start another switching cycle. The operation of the power converter 100 at times D, E, and F are substantially similar to that described with respect to times A, B and C. In one embodiment, the power controller 102 may measure the dead time duration between periods C and D and then use the measured dead time duration to adjust the on-time duration of the switch Q1 during times D and E. By adjusting the length of the switch on-time duration in a subsequent switching cycle based on the dead time in a previous switching cycle, the average input current 132 to the inductor L1 can be maintained in proportion to the rectified input voltage 116, which increases the power factor of the power converter 100.

Figure 3:
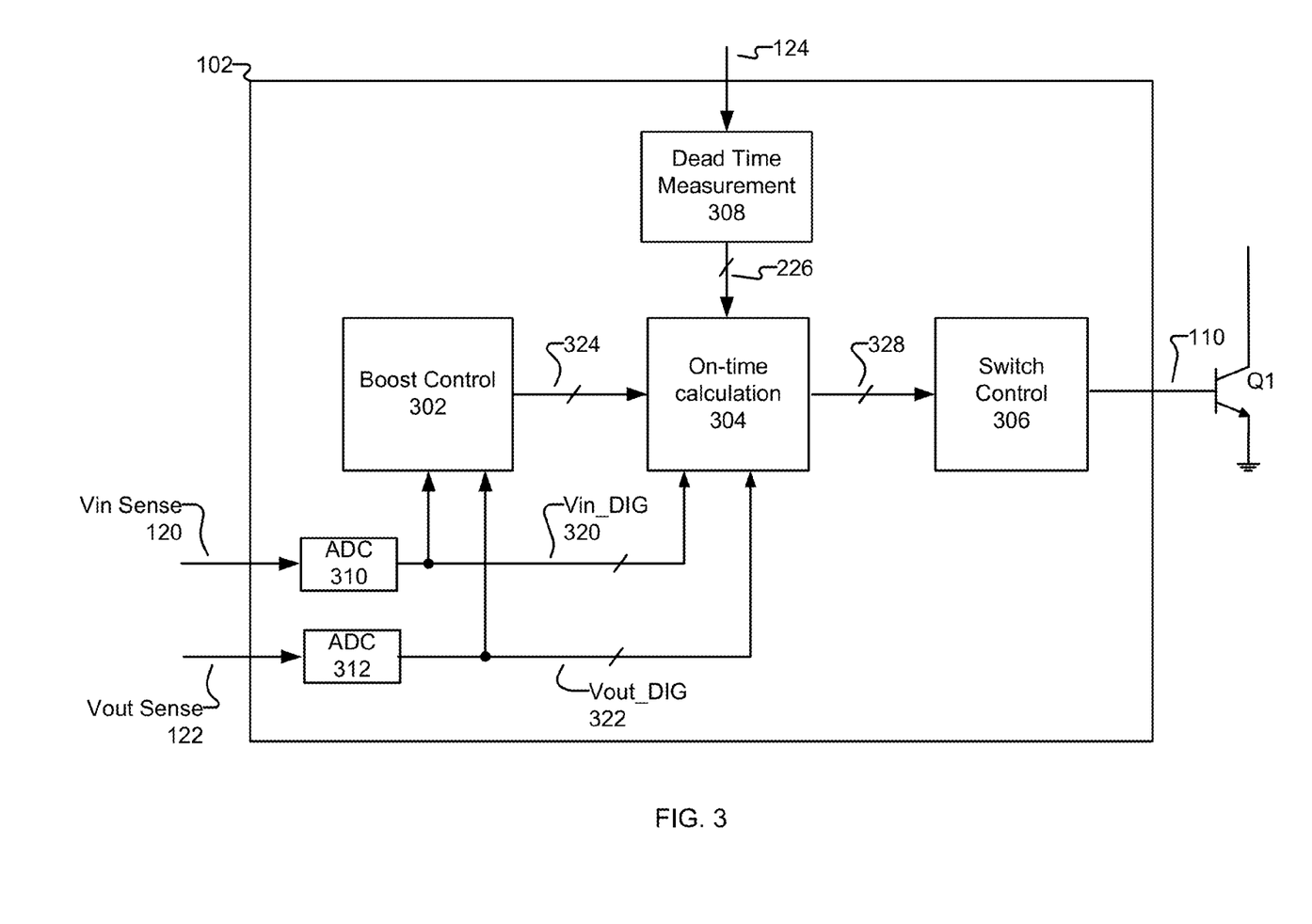
FIG. 3 illustrates the power controller of the switching power converter in more detail, according to one embodiment.

FIG. 3 illustrates the power controller 102 of the switching power converter 100 in more detail, according to one embodiment. Power controller 102 includes several main circuit blocks, including a boost control block 302, an on-time calculation block 304, a switch control block 306 and a dead time measurement block 308. Controller 102 also includes several analog to digital converters (ADC) 310 and 312. ADC 310 converts input voltage sensing signal (Vin Sense) 120 into one or more digital input voltage signals (Vin_DIG) 220. The value of the digital input voltage signals 220 corresponds to a level of the input voltage sensing signal 120, and indirectly indicates a level of the input voltage 112. ADC 312 converts analog output sensing signal (Vout Sense) 122 into one or more digital output voltage signals (Vout_DIG) 322. The value of the digital output voltage signals 322 corresponds to a level of the voltage sensing signal 122 and indirectly indicates a level of the output voltage 114. The remaining circuit blocks then process these digital signals 320, 322 using digital circuitry to generate the switch control signal 110 for regulating the output voltage 114 of the switching power converter 100 while maintaining good power factor. In other embodiments, portions of the power controller 102 may instead be implemented with analog circuitry or in the form of software running on a microcontroller instead of digital circuitry.

Boost control block 302 receives the digital input voltage signals 320 and digital output voltage signals 322 and generates one or more baseline on-time signals 324. The baseline on-time signals 324 include a digital value that represents a baseline on-time duration setting for the switch Q1. In one embodiment, the baseline on-time duration is the on-time duration of the switch Q1 that will result in a desired voltage level of the regulated output voltage 114 under the assumptions that (1) the inductor is being fully reset in each switching cycle and (2) there is zero dead time. The baseline on-time duration may be adjusted to obtain a desired level of voltage boost in the regulated output voltage 114. The baseline on-time duration may also change dynamically to account for any changes in the load of the switching power converter 100.

The boost control block 302 periodically determines the baseline on-time duration from the digital input voltage signals 320 and digital output voltage signals 322. In one embodiment, the boost control block 202 only computes the baseline on-time duration once in every line cycle of the rectified input voltage 114 (e.g., every 8.3 ms) as opposed to every switching cycle of the switch Q1 (e.g., every 0.1 ms). In other embodiments, the boost control block 202 may compute the baseline on-time duration at different periodic intervals, for example, at every switching cycle or at every multiples of switching cycles. The boost control block 302 will be explained in greater detail below with reference to FIG. 5.

Dead time measurement block 308 receives the collector voltage sensing signal 124 and generates one or more dead time duration signals 226. The dead time duration signals 226 include a digital value that represents the duration of the dead time during a switching cycle. In one embodiment, the duration of the dead time is re-computed during each switching cycle of the switch Q1 so that the dead time can be compensated for during a subsequent switching cycle.

Dead time measurement block 308 may determine the duration of the dead time in any of a number of different ways. In one embodiment, the start of the dead time is indicated by a falling edge of the collector voltage sensing signal 124 crossing a threshold voltage. In another embodiment where the collector voltage sensing signal 124 represents a differential voltage across the inductor L1, the start of the dead time is measured from the point in time right before the collector voltage sensing signal 124 starts dropping towards zero volts. In one embodiment, the end of the dead time is indicated by the control signal 110 being asserted to turn on the switch Q1.

The on-time calculation block 304 receives the baseline on-time signals 324, the dead time durations signals 226, the digital input voltage signals 320 and the digital output voltage signals 322 and generates one or more desired on-time signals 328 for controlling the on-time duration of the switch Q1. The on-time signals 328 include digital values that represent a desired on-time duration of the switch Q1 during a switching cycle. The on-time calculation block 304 calculates the desired on-time duration by adjusting the baseline on-time duration to compensate for the effect of the dead time duration. In one embodiment, the on-time calculation block 304 calculates the on-time duration with the following function:

$$t_{on} = \frac{t_{on\_orig}}{2} + \sqrt{\frac{t_{on\_orig}^2}{4} + t_{on\_orig} t_3 \frac{V_o - V_{in}}{V_o}} \quad \text{(Equation 1)}$$

where $t_{on}$ represents the desired on-time duration of the transistor Q1, as determined by the on-time calculation block 304. $t_{on\_orig}$ represents the baseline on-time duration, as determined by the boost control block 302. $t_3$ represents the dead time duration, as determined by the dead time measurement block 308. $V_o$ represents the instantaneous output voltage level as indicated by the value of the output voltage signal 322. $V_{in}$ represents the instantaneous input voltage level as indicated by the value of the input voltage signal 320.

Equation 1 thus computes the desired on-time of the switch Q1 as a function of the baseline on-time duration, the dead-time duration, the input voltage, and the output voltage. The desired on-time duration increases as the baseline on-time duration increases, increases as the dead time duration increases, increases as the output voltage increases, and decreases as the input voltage increases. The desired on-time duration is typically longer than the baseline on-time duration due to the dead time. Additionally, the desired on-time duration causes the input current 132 to the inductor L1 to be relatively proportional to the rectified input voltage 112. As a result, the power factor of the power converter 100 is increased.

In one embodiment, the dead time duration is measured during each switching cycle. Once the dead time duration is determined, the desired on-time duration is then computed so that the on-time duration of the switch Q1 can be set in accordance with the desired on-time duration during a subsequent switching cycle (i.e. the next immediate switching cycle or a later switching cycle). For example, referring back to FIG. 2C, one switching cycle extends from time A to time D. Another switching cycle starts at time D and extends past time F. During the first switching cycle, the dead time duration between time C and time D can be measured. Once this dead time duration is known, it is used during the next switching cycle to compute the desired on-time duration to set the on-time duration of the switch Q1 between time D and time E.

Equation 1 can be derived from the following relationships. Consider a power converter 100 operating in DCM mode as illustrated in FIG. 2C, where d1 is the on-time duty cycle, d2 is the inductor reset duty cycle, d3 is the dead time duty cycle, m1 is the slope of the inductor current 132 during the on time, m2 is the slope of the inductor L1 current 132 during the reset time, and Ts is the switching period. In the DCM boost operation, the following relationships are true:

$$m_1 = \frac{V_{in}}{L_m}$$

$$m_2 = \frac{V_o - V_{in}}{L_m}$$

$$d_2 T_s m_2 = d_1 T_s m_1$$

$L_m$ is the inductance of the inductor L1. From these relationships, it can be determined that:

$$d_2 = \frac{d_1 T_s m_1}{T_s m_2} = \frac{d_1 m_1}{m_2} = \frac{d_1 \frac{V_{in}}{L_m}}{\frac{V_o - V_{in}}{L_m}} = \frac{d_1 V_{in}}{V_o - V_{in}}$$

$$\langle I_L \rangle = \frac{I_{max}}{2}(d_1 + d_2) = \frac{d_1 T_s m_1}{2}\left(d_1 + \frac{d_1 V_{in}}{V_o - V_{in}}\right)$$

$$\langle I_L \rangle = \frac{d_1^2 T_s m_1}{2} \frac{V_o}{V_o - V_{in}} = \frac{d_1^2 T_s m_1 V_o}{2(V_o - V_{in})} = \frac{d_1^2 T_s V_{in} V_o}{2 L_m (V_o - V_{in})}$$

$\langle I_L \rangle$ is the average inductor current over a switching cycle. $I_{max}$ is the peak inductor current during a switching cycle. Solving the above for $d_1$ results in:

$$d_1 = \sqrt{\frac{2 L_m \langle I_L \rangle (V_o - V_{in})}{T_s V_{in} V_o}}$$

Or if it is solved it for Vo:

$$V_o = \frac{2 \langle I_L \rangle L_m V_{in}}{2 \langle I_L \rangle L_m - T_s V_{in} d_1^2}$$

Additionally, the following relationship exists due to power conservation:

$$I_{in} = \langle I_L \rangle = \frac{I_o V_o}{V_{in}}$$

$I_{in}$ is the input current to the inductor L1. The above formula for $V_o$ can thus be re-written as:

$$V_o = \frac{T_s V_{in}^2 d_1^2 + 2I_o L_m V_{in}}{2I_o L_m}$$

So $$\frac{V_o}{V_{in}} = \frac{V_{in} d_1^2 T_s}{2L_m I_o} + 1 \text{ and } I_o = \frac{V_o}{R_L},$$

where $R_L$ represents the load resistance and $I_o$ represents the current supplied to the load. Therefore:

$$\frac{V_o}{V_{in}} = \frac{R_L T_s V_{in} d_1^2 + 2L_m V_o}{2L_m V_o}$$

Now $$I_{max} = t_1 m_1 = t_2 m_2 = t_1 \frac{V_{in}}{L_m} = t_2 \frac{V_o - V_{in}}{L_m} \text{ and } t_2 = \frac{V_{in} t_1}{V_o - V_{in}}.$$

$t_1$ is the duration of the on-time during the switching cycle, and $t_2$ is the duration of the inductor reset time during the switching cycle. Therefore average input current is:

$$I_{in} = \frac{I_{max}}{2} \frac{t_1 + t_2}{t_1 + t_2 + t_3}$$

The input conductance is $$gm_{in} = \frac{I_{in}}{V_{in}}.$$

Substituting $$I_{max} = t_1 \frac{V_{in}}{L_m} \text{ and } t_2 = \frac{V_{in} t_1}{V_o - V_{in}}$$

results in:

$$I_{in} = V_{in} gm_{in} = \frac{V_o V_{in} t_1^2}{2L_m V_o t_1 + 2L_m V_o t_3 - 2L_m V_{in} t_3}$$

Solving this for the required on time results in:

$$t_1 = \sqrt{\frac{L_m gm_{in}(2V_o t_3 - 2V_{in} t_3 + L_m V_o gm_{in})}{V_o}} + L_m gm_{in}$$

In power controller 102, Vo, Vin, and the dead time (t3) can be measured. The following substitution can also be made:

$$K_p = 2L_m gm_{in} = t_{on\_orig}$$

This relationship is true because if the above equation for $t_1$ is solved with $t_3$ set to 0, the result is: $2L_m gm_{in}$, which is the baseline on-time (ton_orig) needed to get the desired output voltage 114 without any compensation. By making those substitutions using $K_P$, the formula becomes:

$$t_{on} = \frac{K_p V_o + \sqrt{K_p V_o (K_p V_o + 4V_o t_3 - 4V_{in} t_3)}}{2V_o}$$

After some simplification, the result is equation 1:

$$t_{on} = \frac{t_{on\_orig}}{2} + \sqrt{\frac{t_{on\_orig}^2}{4} + t_{on\_orig} t_3 \frac{V_o - V_{in}}{V_o}} \quad \text{(equation 1)}$$

In one embodiment, on-time calculation block may not use equation 1 to calculate the desired on-time duration. Instead, a simplified version of equation 1 is used by the on-time calculation block 304 to calculate the desired on-time duration. The function is as follows:

$$t_{on} = t_{on\_orig}\left(1 + \frac{t_3}{t_{on\_orig}} \frac{V_o - V_{in}}{V_o}\right) \quad \text{(equation 2)}$$

Equation 2 is derived from equation 1 by re-arranging equation 1 and making the assumption that the desired on-time duration and the baseline on-time duration are substantially similar to each other to remove some terms from the equation. The use of equation 2 is most appropriate in situations where dead time duration is significantly less than the on-time duration. Equation 2 is not as accurate as equation 1, however, equation 2 is easier to implement in circuitry than equation 1 because it does not require the square root calculation involving the baseline on time duration, dead time duration, input voltage, and output voltage. Instead, equation 2 only needs an addition, subtraction, and two division operations to calculate the desired on-time.

In yet another embodiment, equation 1 can be re-arranged into the following equation, which is used by the on-time calculation block 304 to calculate the desired on-time:

$$t_{on} = \frac{t_{on\_orig}}{2} + t_{on\_orig}\sqrt{.25 + k} \quad \text{(equation 3)}$$

where $$k = \frac{t_3}{t_{on\_orig}} \frac{V_o - V_{in}}{V_o}$$

Figure 4:
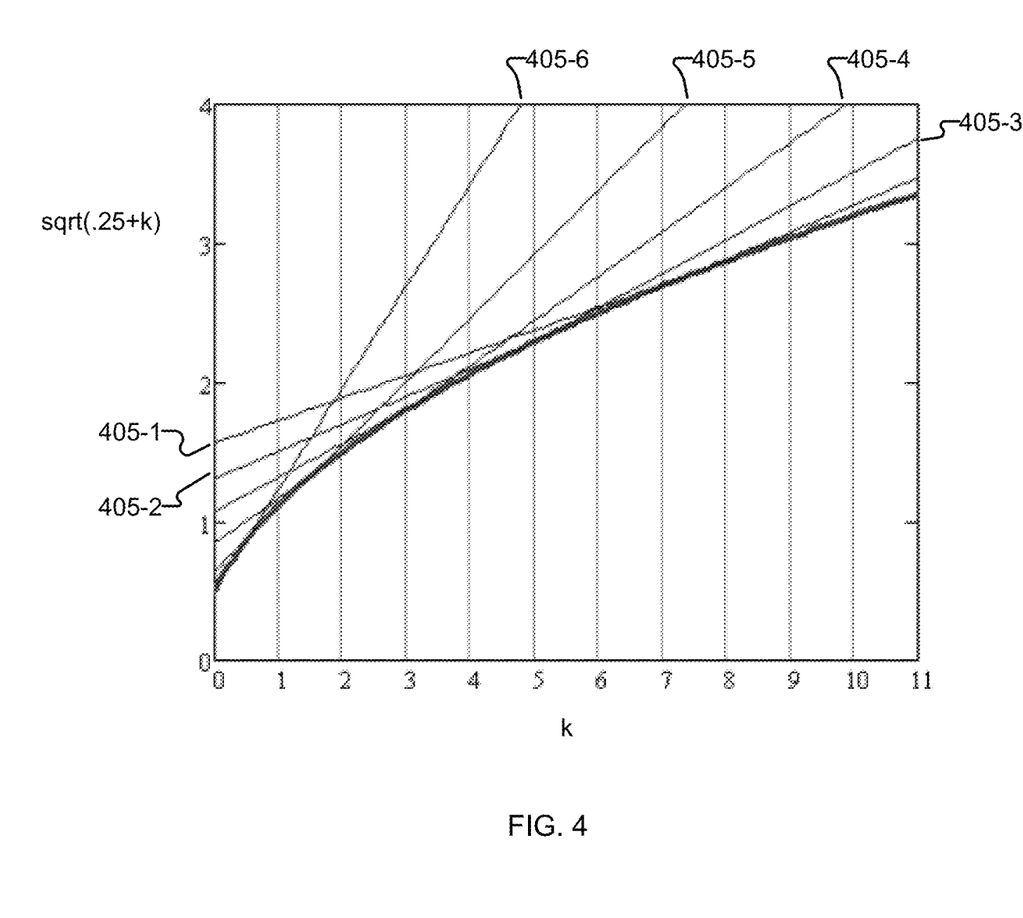
FIG. 4 illustrates a piecewise linear approximation for evaluating $\sqrt{0.25+k}$, according to one embodiment.

The function $\sqrt{0.25+k}$ is evaluated using a piece wise linear approximation as seen in FIG. 4. FIG. 4 illustrates a piecewise linear approximation for evaluating $\sqrt{0.25+k}$, according to an embodiment. The x axis represents the value of k. The y axis represents $\sqrt{0.25+k}$. This piece-wise linear approximation makes use of six different linear functions 405-1, 405-2, 405-3, 405-4, 405-5 and 405-6 for computing $\sqrt{0.25+k}$. Each linear function 405 is selected based the value of k. For example, function 405-1 may be selected for computing $\sqrt{0.25+k}$ if the value of k is between 8 and 11. As another example, function 405-6 may be selected for computing $\sqrt{0.25+k}$ if the value of k is between 0 and 0.5.

Equation 3 is simpler to implement with circuitry than equation 1 because it approximates the square root calculation with a piece-wise linear approximation of the square root calculation instead of explicitly performing a square root calculation. Equation 3 is also more accurate than equation 2, especially in situations where the dead time is significant, because equation 3 does not rely on assumptions to remove terms from the equation.

Referring back to FIG. 3, switch control block 306 receives the on-time signals 328 and generates a switch control signal 110 for turning switch Q1 ON and OFF. Switch control block 306 sets the duration of time in which the control signal 110 is in an ON state in accordance with the value of the desired on-time duration. When the control signal 110 is in the ON state (e.g. having a high voltage level), it turns the switch Q1 ON. When the control signal 110 is in the OFF state (e.g. having a low voltage level), it turns the switch Q1 OFF. In one embodiment, the switch control block 306 includes a timer that converts the desired on-time duration value into a voltage pulse that turns the switch Q1 on. Higher desired on-time duration values result in longer pulses, and shorter desired on-time values result in shorter pulses.

Figure 5:
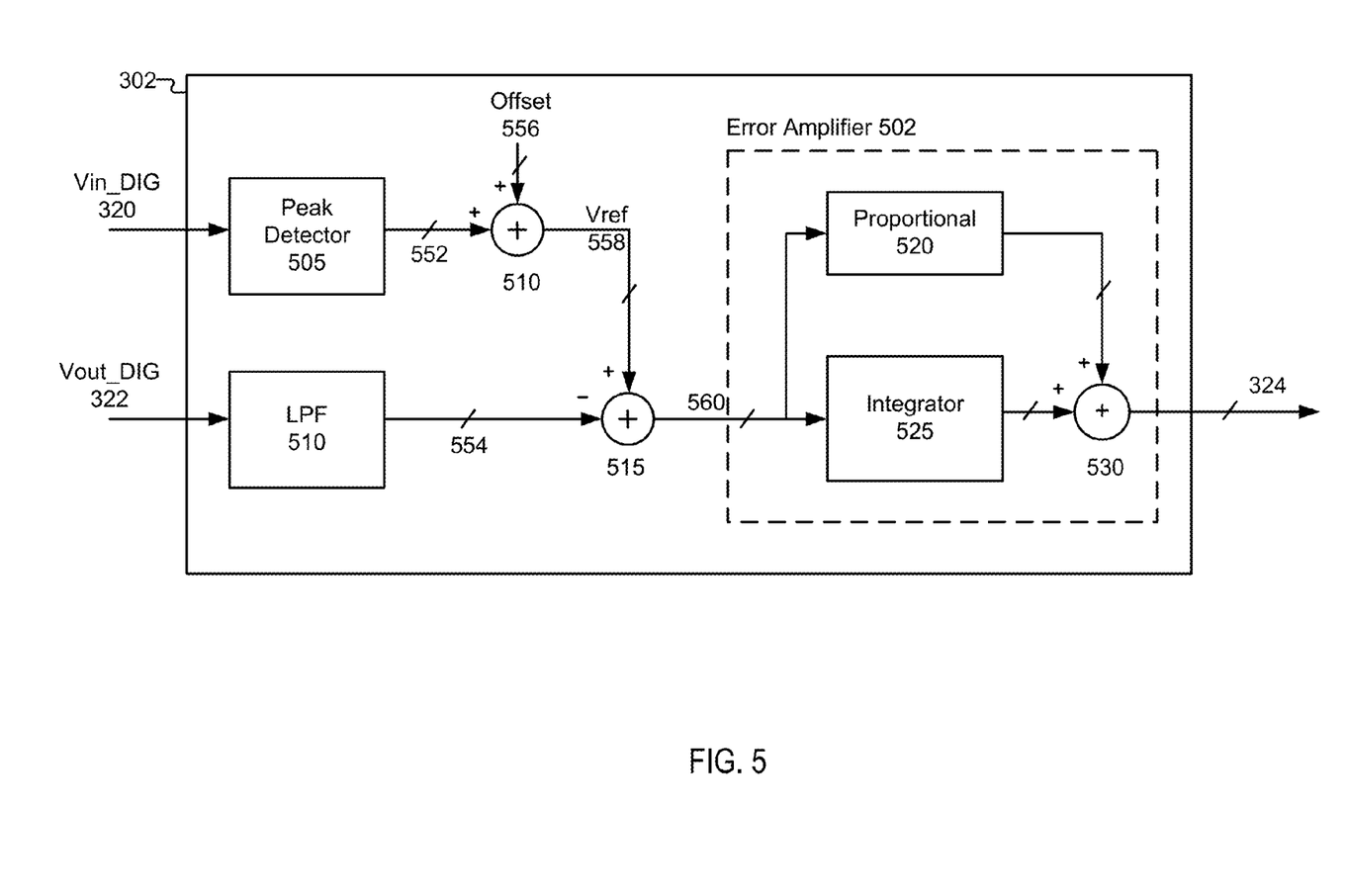
FIG. 5 illustrates the boost control block of the power controller in more detail, according to one embodiment.

FIG. 5 illustrates the boost control block 302 of the power controller 102 in more detail, according to one embodiment. The boost control block 302 includes a peak detector 505 that receives the digital input voltage signals 320 and outputs one or more a peak detection signals 552 that represent a peak value of the digital input voltage signals 320. An offset 556 is added to the value of the peak detection signals 552 by the summer circuit 510. The size of the offset 556 determines the amount of the voltage boost in the output voltage 114 relative to the input voltage 112. In other words, the higher the offset 556, the higher the voltage level of the output voltage 114 becomes. The output of the summer circuit 510 is one or more reference voltage signals 558 that represent an offset adjusted input voltage 112.

The low pass filter (LPF) 510 removes high-frequency ripples from the digital output voltage signals 320 and generates one or more averaged voltage signals 554 that represent an average value of the digital output voltage signals 320. The value of the averaged voltage signals 554 is subtracted from the value of the reference voltage signals 558 by subtractor circuit 515 to generate one or more boost error signals 560. The averaged voltage signals 554 are essentially used in closed-loop to provide feedback about whether the output voltage 114 should be increased. Thus, the value of the boost error signals 560 indicates whether the output voltage 114 needs to be increased or decreased, and if so, by how much.

The boost error signals 560 are provided to an error amplifier 502 that generates the baseline on-time signals 324. The value of the baseline on-time signals 324 represents a baseline on-time duration of the switch Q1. The error amplifier 502 implements a P-I function (proportional-integral function) that includes a proportional portion 520 and an integrator portion 525. The proportional portion 520 scales the boost error value by a constant value. The integrator portion 525 integrates the boost error values over time and scales it by a constant value. Summer circuit 530 adds the outputs of the proportional portion 520 and the integrator portion 525 to generate the baseline on-time signals 324.

Figure 6:
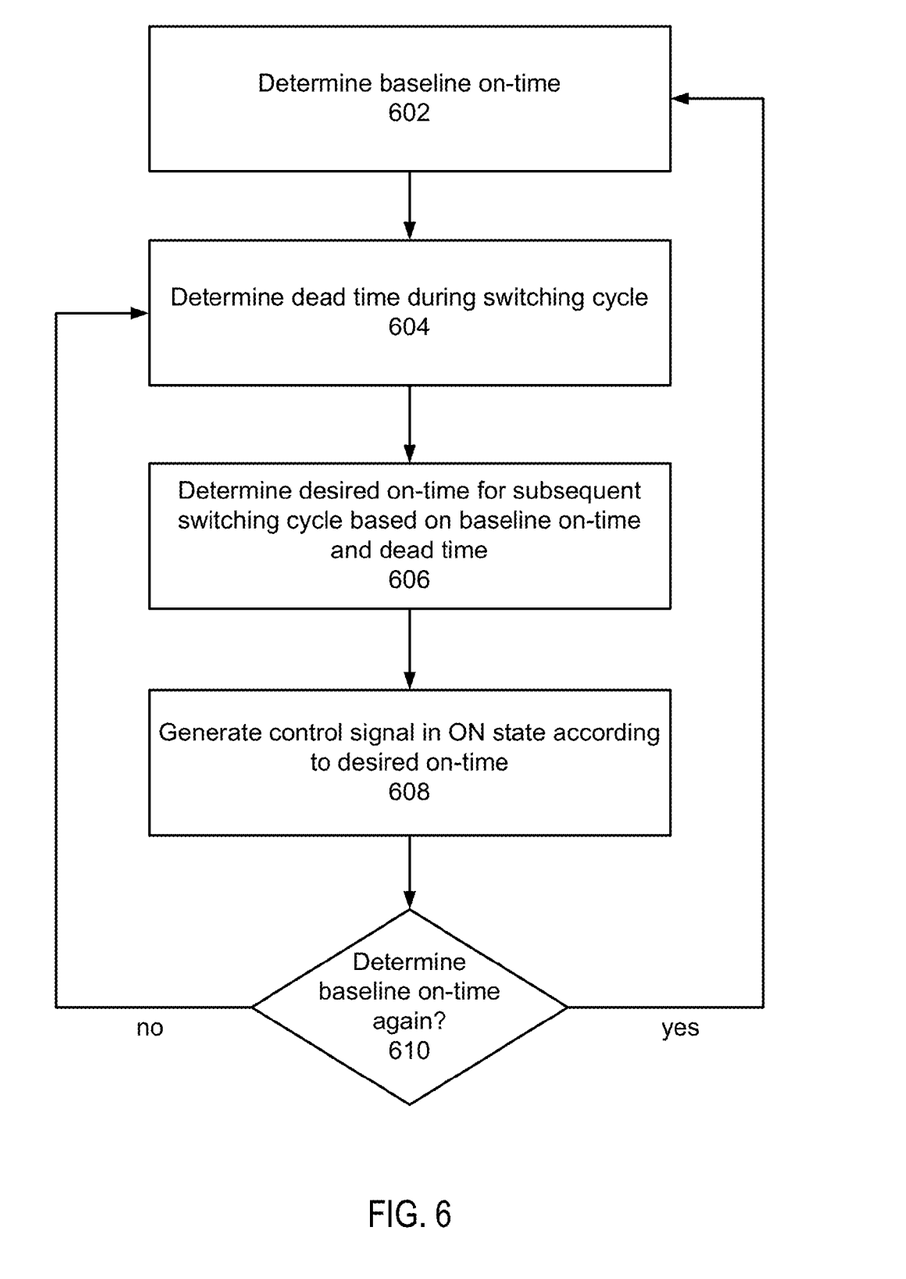
FIG. 6 illustrates a method of operation in a power controller, according to an embodiment.

FIG. 6 illustrates a method of operation in a power controller 102, according to an embodiment. In step 602, the power controller 102 determines a baseline on-time duration for the switch Q1. In step 604, the power controller 102 determines a dead time duration of a switching cycle. During the dead time, the current 132 through the inductor is substantially flat and may be equal to zero. In step 606, the power controller 102 determines a desired on-time duration of the switch Q1 for a subsequent switching cycle based on the baseline on-time duration and the dead-time duration. The subsequent switching cycle can be the next immediate switching cycle that follows the initial switching cycle during which dead time duration was determined. Alternatively, the subsequent switching cycle can be a switching cycle that is later in time and does not immediately follow the initial switching cycle. In step 608, the power controller 102 generates a control signal 110 in an ON state to turn on the switch Q1 according to the desired on-time duration. The power controller 102 maintains the duration of the ON state of the control signal 110 during the subsequent switching cycle based on the desired on-time duration, which causes the switch Q1 to be switched on for a controlled length of time that improves power factor.

In one embodiment, when a measured dead time duration in a switching cycle is used to determine the on-time duration in the next immediate switching cycle, steps 606 and 608 may be performed substantially simultaneously. Control signal 110 is thus placed into an ON state as the desired on-time being calculated and then taken out of the ON state in accordance with the desired on-time once the desired on-time is determined. In other words, referring to FIG. 2C, the switch can be turned ON at time D, the desired on-time can be calculated between time D and E, and then the switch Q1 can be turned OFF at time E once the desired on-time is known.

In step 610, the power controller 102 determines whether the baseline on-time duration should be refreshed. As mentioned, the baseline turn on time may only be determined at periodic intervals and then used during many different switching cycles to determine the desired on-time duration. If the baseline on-time duration does not need to be refreshed, steps 604 through 608 are repeated. If the baseline on-time duration should be refreshed, the process returns to step 602 in order to determine a new baseline on-time duration.

Figure 7A:
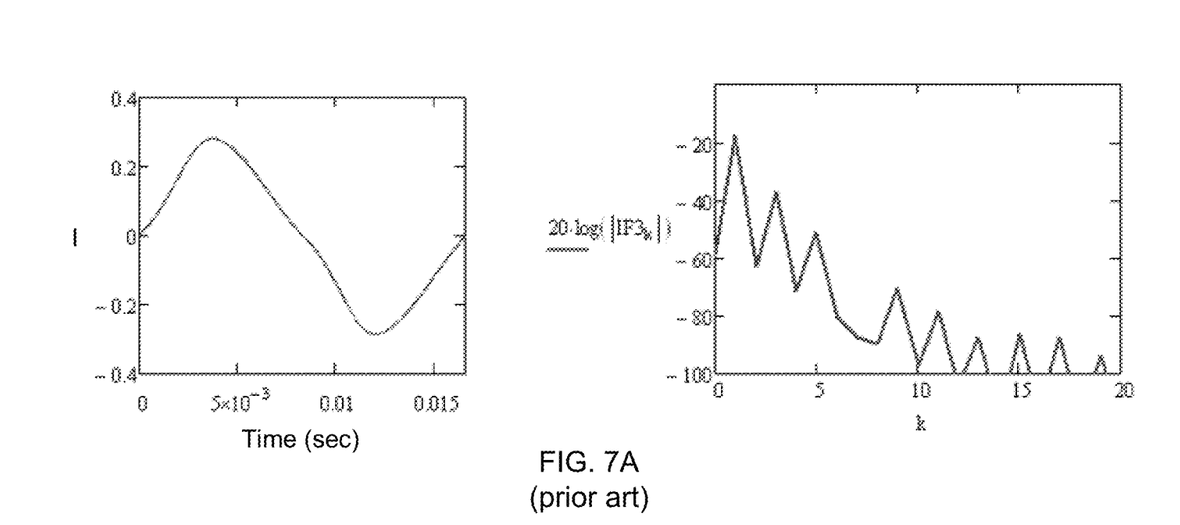
FIG. 7A illustrates waveforms of the average input current to the power converter when the on-time is not being compensated.

FIG. 7A illustrates waveforms of the average input current to the power converter 100 when the on-time duration is not being compensated to correct for the effect of dead time. The left side of FIG. 7A is a graph of the input current to the bridge rectifier BR1. The horizontal axis represents time, and the vertical axis represents a level of the input current. Because dead time compensation is not enabled, the input current is not sinusoidal, but is instead slightly distorted. This distortion reduces the power factor of the power converter 100 because the input current is not proportional to the AC input voltage VAC. The right side of FIG. 7A is a Fourier transform of the input current from the left side of FIG. 7A. The horizontal axis represents harmonics of the input current and the vertical axis represents a magnitude of the harmonics. As shown, the distortion in the input current results in a significant level of odd harmonics (e.g., at k=3, 5) that increase electromagnetic interference (EMI).

Figure 7B:
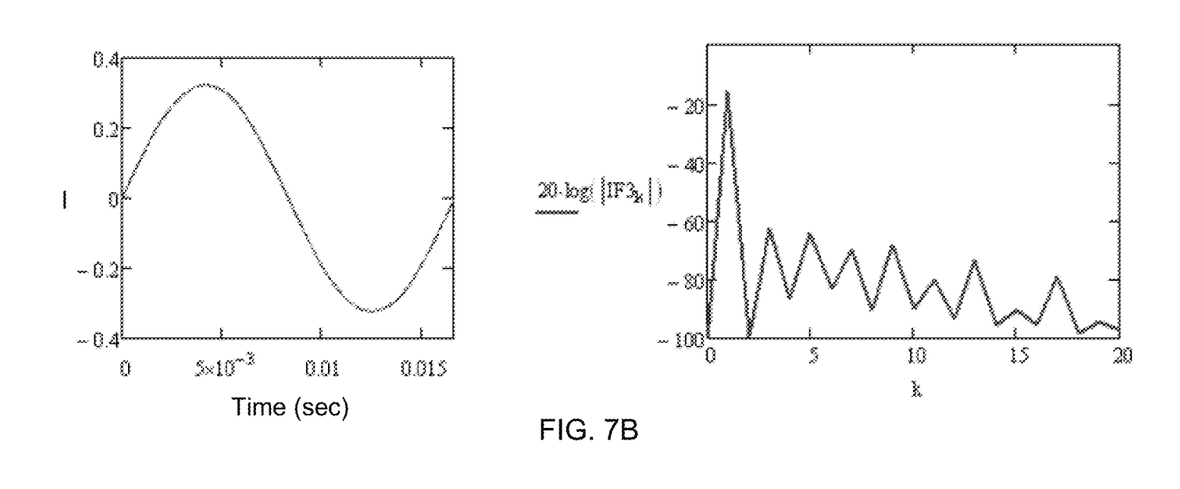
FIG. 7B illustrates waveforms of the average input current to the power converter when the on-time is being compensated, according to one embodiment.

FIG. 7B illustrates waveforms of the average input current to the power converter 100 when the on-time duration is being compensated to correct for the effect of the dead time duration, according to an embodiment. The left side of FIG. 7B is a graph of the input current to the bridge rectifier BR1. The horizontal axis represents time, and the vertical axis represents a level of the input current. Because dead time compensation is enabled, the input current is almost perfectly sinusoidal and in proportion to the AC input voltage VAC, which increases the power factor of the power converter 100. The right side of FIG. 7B is a Fourier transform of the input current from the left side of FIG. 7B. The horizontal axis represents harmonics of the input current and the vertical axis represents a magnitude of the harmonics. Because the distortion is reduced, the odd harmonics are much lower than in FIG. 7B, resulting in decreased EMI.

Upon reading this disclosure, those of skill in the art will appreciate still additional alternative embodiments of on-time compensation for switch-mode power converters through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope described herein.

What is claimed is:

1. A switching power converter comprising:
a magnetic component coupled between an input voltage and an output voltage of the switching power converter;
a switch coupled to the magnetic component to control current through the magnetic component, wherein the current increases when the switch is turned on and decreases to a substantially constant current level when the switch is turned off; and
a controller configured to generate a control signal to turn on or turn off the switch, the switch turned on responsive to the control signal being in a first state and the switch turned off responsive to the control signal being in a second state,
wherein the controller is configured to determine a dead time duration of a first switching cycle of the power converter, the dead time duration being a duration of time during which the current flowing into the magnetic component is at the substantially constant current level,
wherein the controller is configured to determine a desired on-time duration of the switch for a second switching cycle of the power converter based on the dead time duration in the first switching cycle, the second switching cycle being subsequent to the first switching cycle, and
wherein the controller is configured to generate, for the second switching cycle, the control signal in the first state for a duration of time that turns on the switch according to the desired on-time duration.

2. The switching power converter of claim 1, wherein the controller is further configured to determine a baseline on-time duration of the switch and to determine the desired on-time duration based on the baseline on-time duration and the dead time duration in the first switching cycle.

3. The switching power converter of claim 2, wherein the baseline on-time duration is an on-time duration of the switch that regulates the output voltage to a desired voltage level if the dead time duration is zero.

4. The switching power converter of claim 2, wherein the desired on-time duration is longer in duration than the baseline on-time duration.

5. The switching power converter of claim 2, wherein controller determines the desired on-time duration by calculating the desired on-time duration as a function of the baseline on-time duration and the dead time duration during the first switching cycle.

6. The switching power converter of claim 5, wherein controller further calculates the desired on-time duration as a function of an input voltage value indicative of a level of the input voltage and an output voltage value indicative of a level of the output voltage.

7. The switching power converter of claim 6, wherein the controller further calculates the desired on-time duration without a square root calculation involving the baseline on-time duration.

8. The switching power converter of claim 6, wherein the controller further calculates the desired on-time duration with a linear piecewise approximation of a square root calculation involving the baseline on-time duration.

9. The switching power converter of claim 2, wherein the controller is further configured to determine the baseline on-time duration based on an input feedback signal indicative of a level of the input voltage and an output feedback signal indicative of a level of the output voltage.

10. The switching power converter of claim 9, wherein the controller is further configured to generate one or more peak detection signals indicative of a peak voltage level of the input feedback signal, to generate one or more averaged output signals indicative of an averaged voltage level of the output feedback signals, and to determine the baseline on-time duration based on the peak detection signals and the averaged output signals.

11. The switching power converter of claim 10, wherein the controller is further configured to adjust the peak detection signals with an offset representative of a desired level of boost in the output voltage to generate one or more reference voltage signals, the controller determining the baseline on-time duration based on the reference voltage signals.

12. A method of operation in a switching power converter that includes a magnetic component coupled between an input voltage and an output voltage of the switching power converter, a switch coupled to the magnetic component to control current through the magnetic component, wherein the current increases when the switch is turned on and decreases to a substantially constant current level when the switch is turned off, and a controller configured to generate a control signal to turn on or turn off the switch, the switch turned on responsive to the control signal being in a first state and the switch turned off responsive to the control signal being in a second state, the method comprising:
determining a dead time duration of a first switching cycle of the power converter, the dead time duration being a duration of time during which the current flowing into the magnetic component is at the substantially constant current level;
determining a desired on-time duration of the switch for a second switching cycle of the power converter based on the dead time duration in the first switching cycle, the second switching cycle being subsequent to the first switching cycle; and
generating, for the second switching cycle, the control signal in the first state for a duration of time that turns on the switch according to the desired on-time duration.

13. The method of claim 12, further comprising:
determining a baseline on-time duration of the switch, and wherein the desired on-time duration is determined based on the baseline on time duration and the dead time duration in the first switching cycle.

14. The method of claim 13, wherein the baseline ton-time duration is an on-time duration of the switch that regulates the output voltage to a desired voltage level if the dead time duration is zero.

15. The method of claim 13, wherein the desired on-time duration is longer in duration than the baseline on-time duration.

16. The method of claim 13, wherein determining the desired on-time duration comprises calculating the desired on-time duration as a function of the baseline on-time duration and the dead time duration during the first switching cycle.

17. The method of claim 16, wherein the desired on-time duration is further calculated as a function of an input voltage value indicative of a level of the input voltage and an output voltage value indicative of a level of the output voltage.

18. The method of claim 17, wherein the desired on-time duration is calculated without a square root calculation involving the baseline on-time duration.

19. The method of claim 17, wherein the on-time duration is calculated with a linear piecewise approximation of a square root calculation involving the baseline on-time duration.

20. The method of claim 13, wherein the baseline on-time duration is determined based on an input feedback signal indicative of a level of the input voltage and an output feedback signal indicative of a level of the output voltage.

21. The method of claim 20, further comprising:
generating one or more peak detection signals indicative of a peak voltage level of the input feedback signal; and
generating one or more averaged output signals indicative of an averaged voltage level of the output feedback signals,
wherein the baseline on-time duration is determined based on the peak detection signals and the averaged output signals.

22. The method of claim 21, further comprising:
adjusting the peak detection signals with an offset representative of a desired level of boost in the output voltage to generate one or more reference voltage signals,
wherein the baseline on-time duration is further determined based on the reference voltage signals.

23. A controller for a switching power converter, the switching power converter comprising a magnetic component coupled between an input voltage and an output voltage of the switching power converter and a switch coupled to the magnetic component to control current through the magnetic component, wherein the current increases when the switch is turned on and decreases to a substantially constant current level when the switch is turned off, the controller comprising:
a switch control circuit configured to generate a control signal to turn on or turn off the switch, the switch turned on responsive to the control signal being in a first state and the switch turned off responsive to the control signal being in a second state,
wherein the controller is configured to determine a dead time duration of a first switching cycle of the power converter, the dead time duration being a duration of time during which the current flowing into the magnetic component is at the substantially constant current level,
wherein the controller is configured to determine a desired on-time duration of the switch for a second switching cycle of the power converter based on the dead time in the first switching cycle, the second switching cycle being subsequent to the first switching cycle, and
wherein the switch control circuit is configured to generate, for the second switching cycle, the control signal in the first state for a duration of time that turns on the switch according to the desired on-time duration.

* * * * *

UNITED STATES PATENT AND TRADEMARK OFFICE
CERTIFICATE OF CORRECTION

PATENT NO. : 8,564,270 B2  
APPLICATION NO. : 13/759639  
DATED : October 22, 2013  
INVENTOR(S) : John William Kesterson and Liang Yan Page 1 of 1

It is certified that error appears in the above-identified patent and that said Letters Patent is hereby corrected as shown below:

In the Claims

Column 14, line 59, replace "ton-time" with --on-time--.

Signed and Sealed this
Third Day of February, 2015

Michelle K. Lee
*Deputy Director of the United States Patent and Trademark Office*